June 14, 1949.  H. J. KNAGGS  2,473,284
APPARATUS FOR MOLDING SEALING RINGS
Filed July 26, 1945  2 Sheets-Sheet 1

INVENTOR.
HAROLD J. KNAGGS
BY Richey & Watts
ATTORNEYS

INVENTOR.
HAROLD J. KNAGGS
BY Richey + Watts
ATTORNEYS

Patented June 14, 1949

2,473,284

UNITED STATES PATENT OFFICE 2,473,284

APPARATUS FOR MOLDING SEALING RINGS

Harold J. Knaggs, Cleveland, Ohio, assignor to The Weatherhead Company, Cleveland, Ohio, a corporation of Ohio Application July 26, 1945, Serial No. 607,221

1 Claim. (Cl. 18—42)

This invention relates to apparatus for forming molded rings of rubber and similar material and particularly rings to be used in seals for pistons and like purposes.

Molded rings of the type indicated have been imperfect because flash from the molding process is formed over part of the wiping and sealing surface of the ring. To a considerable extent this flash leaves a bump or ridge that partially destroys the sealing action of an otherwise smooth wiping and sealing surface. To remove such flash and place such rings in condition for use it is necessary to carefully cut or grind off the flash. No matter how carefully this operation is performed the sealing surface is somewhat roughened and the smooth and sealed skin which was produced in the mold is ruptured or even removed. Further the dimensions of the ring itself are altered to the extent that too much or too little flash is taken off.

Such rings made by methods and apparatus heretofore used have also been subject to other disadvantages. In one form of sealing ring there is provided a straight sided and smooth portion adapted to be received within an annular groove or recess of a piston or cylinder member. One part of the ring is formed with a smoothly rounded wiping and sealing surface which bears against the other member to be sealed. In the formation of rings of this type it is a problem to control properly the external dimensions of such groove received portion to insure a proper fit and limit cold flow of the ring composition due to space or lack of space in the supporting groove. In like manner it is important to control the dimensional relations between the sealing and wiping surface and the groove received portion of the ring to provide a finished ring that provides an effective seal according to the dictates of the designer.

It is the chief object of the present invention to mold a sealing ring with a sealing surface skin unbroken upon removal from the mold and free from any flash or similar protruding surfaces whose presence or removal might result in destruction of the smoothness of the sealing surface. A further object of the invention is to make sealing rings accurately and with closely controlled dimensions. Another object is the provision of an improved sealing ring in which all of the dimensional values are closely controlled and in which the wiping and sealing surface remains in the smooth unbroken curve desired and with its surface skin as formed in the mold unbroken and completely free from all flash.

Another object is to mold articles from rubber or similar material under slight pressure, so as to increase the density and aid in controlling the physical dimensions during curing. Other objects of the invention will become apparent from the following specification when read in the light of the accompanying drawings. The novel features of the invention are summarized in the claims.

Figure 1:
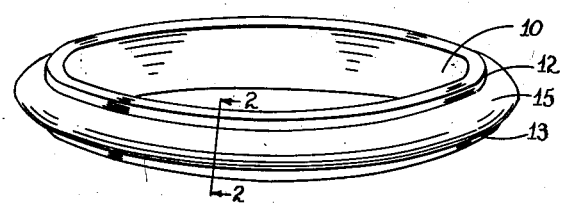
Fig. 1 is a perspective view of a sealing ring embodying the present invention.
Figure 2:
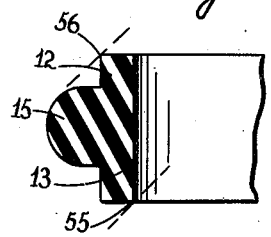
Fig. 2 is a cross section through the ring of Fig. 1.

Referring first to Figs. 1 and 2, a sealing ring formed according to this invention comprises a soft resilient member 10 of rubber or like material either synthetic or natural, all of which materials are intended to be included within the term "rubber" as it is used hereinafter, and having a T-shaped cross section. The arms of the T are indicated at 12 and 13 and are connected on one side (the right hand side in Fig. 2) by a straight sided surface which is the inner cylindrical face of the ring as shown in Fig. 1. On the left hand side (Fig. 2) the cross section is shown to include the base of a T section. This base is somewhat thicker than the arms and is formed at 15 with a smoothly curved wiping and sealing surface. This surface forms the outside of the ring as shown in Fig. 1, although it will be apparent that a ring may be made in which the position of the straight surface and the surface 15 are reversed. Both forms of ring are within the concept of this invention. It is this surface 15 that must be kept smooth and in the condition in which it left the mold in order that the best sealing surface be provided for engagement with the sealing surface of the cooperating member.

According to the present invention, rings of this type are formed in a mold or die comprising male and female members adapted to be telescoped together. An annular cavity is partially formed in each die member such that when the parts are completely telescoped a cavity whose cross section corresponds in outline with Fig. 2 is formed. Prior to telescoping the die surfaces together a charge of material, for example, uncured rubber, is placed in the female member and as the dies are telescoped, due to the construction of the dies themselves, the material is forced up through a clearance space between the dies and into the T-section cavity. The composition of the ring is not limited to a specific material. Any substance, mixture or compound that can be formed in a mold to provide a ring that is somewhat resilient falls within the scope of this invention.

It is difficult accurately to gauge the charge supplied to the mold and provide the precise amount of material to fill the cavity. For this reason a slight excess of material is supplied, and some material is necessarily forced into the cavity and on out of it at the other side. As a result, flash is ultimately produced in the process at one or both of the two edges of the finished sealing ring which are formed by the meeting surfaces of the two mold members.

In accordance with the present invention these regions in which flash is formed are at one or both of the sharp edges or corners of the arms 12 and 13 of the T section ring and are sufficiently spaced from the sealing surface 15 to insure that there shall be no interference with said surface and no flash formed on it. To insure the complete filling of the die cavity under pressure, the passage by which material is admitted thereto from the charge below is somewhat larger in area than is the path by which any excess is removed. Thus it is easier for material to flow in than out of the cavity. The exit path functions also to permit escape of fluid, generally air under atmospheric pressure, that is present in the die cavity when the parts are initially telescoped together.

Figure 3:
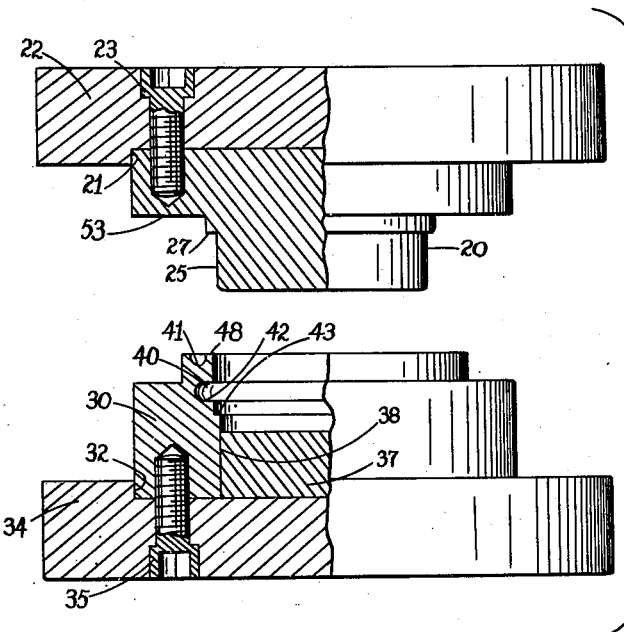
Fig. 3 is a view partially in elevation and partially in section of the male and female die members used in this invention.
Figure 4:
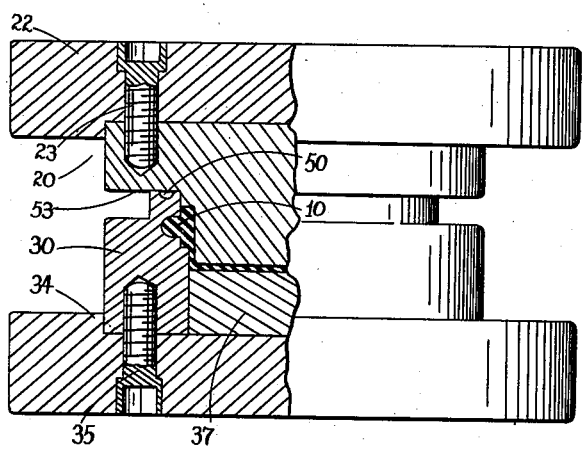
Fig. 4 is a view similar to Fig. 3 but showing the die parts telescoped into closed or molding position.

Referring now to Figs. 3 and 4, the male die 20 is seen as the upper member and is secured in a recess 21 of a die plate 22. The die may be bolted to the die plate by hollow head cap screws 23. The plate 22 in turn is bolted or otherwise secured to the upper, generally the ram or plunger, member of any suitable molding press (not shown). That part of the upper and male die which cooperates with the lower die to form a complete ring cavity comprises a cylindrical surface 25 terminating in an abutment 27. The surface 25 corresponds to the inner cylindrical surface of the ring 10 and the shoulder 27 determines the position and shape of the end of the upper arm 12 of the ring.

The lower or female die comprises a die ring 30 positioned within a recess 32 of a lower die block 34 and is secured to the lower die block by screws 35. The die block in turn is secured to the lower member, generally the bed, of the molding press. The base of the female die is formed by a cylindrical plate 37 closely fitted within the inner cylindrical surface 38 of the die member 30. The charge of rubber or other material is placed on the top of this plate.

The inner surface of the die block 30 is provided with a cavity which combines with the surfaces 25 and 27 of the block 20 to form a die cavity of the outline of Fig. 2 for the completed ring 10. To this end the said inner surface is formed with an annular recess 40 bounded on each side by straight cylindrical portions 41 and 42. The recess 40 extends continuously around the ring 30 with a smooth and unbroken contoured surface to form the sealing and wiping surface of the ring 10. The portion 42 terminates at 43 in an abutment, which with the abutment 27, determines the combined length of the arms 12 and 13 forming the T section.

Figure 5:
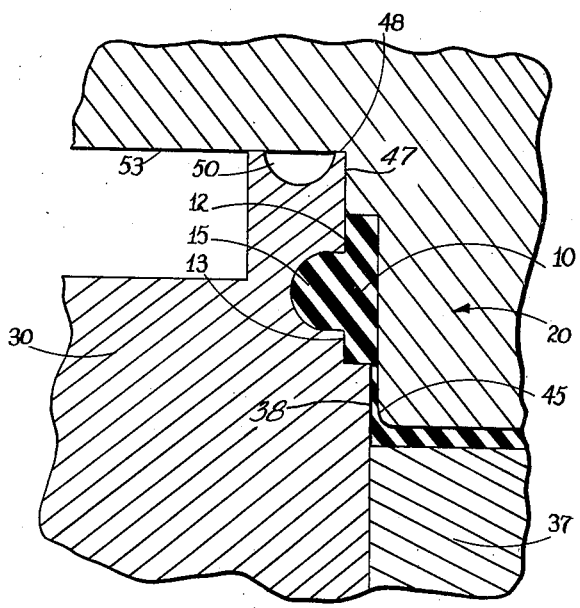
Fig. 5 is an enlarged detail showing in section the formation of a ring in the die members while they are telescoped.

To insure that the die cavity will be completely filled with material, the clearance between the male and female die in telescoped position is considerably greater at 45 than at 48 (Fig. 5). The clearance at 45 is sufficient to permit easy flow of the material from the plate 37 on which it is placed upward, parallel to the line of travel of the dies, into the ring cavity. On the other hand, the clearance at 47, while sufficient to permit relative sliding movement of the die parts and to permit escape of any fluid imprisoned in the die cavity, restricts the flow of the material from the die cavity. The purpose of this slight clearance is to insure that the die cavity will be full before the excess is forced out the cavity as the dies are completely telescoped together. Such material as does flow through the region 47 before the dies are completely closed or telescoped passes across the upper edge 48 of the die ring 30 and into an annular upwardly opening recess 50 provided to receive the excess material. At the time the dies reach completely closed position the edge 48 cooperates with a face 53 on the upper die to rim off such over flow stock.

The overall width of the ring as bounded by the arms 12 and 13 and the extent to which the dies may be telescoped together are determined by the relation between the position of the abutment 43 and the upper edge 48 of the die ring 30, and the relation between the position of the abutment 27 of the male die member 20 and the radial surface 53 which bottoms against the edge 48. When the dies are in the fully telescoped position shown in Figs. 4 and 5, the material placed in the die on plate 37 has been forced to fill the die cavity completely and the structural formation of the ring is complete. By reason of the closed construction of the mold cavity, the material is molded under slight pressure, which increases the density of the finished articles and helps to control the physical dimensions during curing.

The ring in the die of the mold may then be cured as desired to insure the proper physical structure for the completed ring. After the curing has been completed the ring is removed from the die. To permit this, the dies are separated by withdrawing the male member from the female member. This is possible because the only surface of the formed ring 10 across which the die must slide is the inner cylindrical surface of the ring, which contacts only the cylindrical surface 25 of the male die member. Except for the radial surface in engagement with the shoulder 27, the other surfaces of the ring are all formed within the die ring 30. Thus the male member may be slid out of the member 30 without requiring any deformation of the ring, which remains in the cavity of the female member.

It is then possible due to the resiliency of the material from which the ring 10 has been formed to flex it and remove it from the die. After the ring has been removed there is found to exist a small amount of flash at each end of the arms of the ring along the edges indicated at 55 and 56 in Fig. 2. Due to the fact that the surfaces adjacent this flash do not form parts of the actual wiping and sealing surface, the flash does not need to be removed with great care. Since the flash is at the edges, by cutting across an edge at an angle to the sides as indicated by the dotted lines in Fig. 2, the said sides are substantially unharmed and hence no dimensions of the ring are altered.

This would not be possible if the flash were formed in the manner heretofore known by dividing the dies in a plane parallel to the plane of the ring and in the middle of the section shown in Fig. 2. Such a construction leaves flash along the outer curved wiping and sealing surface and this, as above stated, causes difficulty in preparing the ring for final use.

From the foregoing description it will be seen that the apparatus for forming sealing rings as well as the sealing ring of this invention overcome disadvantages heretofore present in their fabrication. The final result with this invention is a smooth uniform and unbroken sealing surface in a ring of uniform, accurately controllable dimensions to provide a uniform seal with the member with respect to which the ring slides.

I claim:

In apparatus of the class described, telescoping male and female die members, said die members having an annular region of very small clearance therebetween when telescoped together and another annular region of greater clearance axially spaced therefrom, an annular die cavity disposed between said clearance regions and formed partially in each of said die members to provide a mold for a ring-like sealing member with a sealing surface, that portion of said cavity that forms the boundary of the sealing surface comprising a groove lying entirely in one of said die members and having a smooth wall unbroken by joints in the die, a charge space in one of said die members to receive a charge of material to be formed in said cavity, said charge space being in communication with said die cavity via said annular region of greater clearance, said die members acting when telescoped to force the material into the die cavity through said region of greater clearance and simultaneously force gas out of said die cavity through said region of very small clearance.

HAROLD J. KNAGGS.

REFERENCES CITED

The following references are of record in the file of this patent:

UNITED STATES PATENTS

| Number | Name | Date |
|---|---|---|
| 1,658,567 | MacDonald | Feb. 7, 1928 |
| 1,683,755 | Bigelow | Sept. 11, 1928 |
| 1,904,845 | Zelenka | Apr. 18, 1933 |
| 2,208,620 | Baisch | July 23, 1940 |
| 2,251,858 | Snell | Aug. 5, 1941 |
| 2,330,762 | Tooker | Sept. 28, 1943 |
| 2,349,170 | Jackman | May 16, 1944 |